United States Patent [19]
Piety et al.

[11] Patent Number: 5,544,073
[45] Date of Patent: Aug. 6, 1996

[54] ROTOR BALANCING CALCULATOR

[75] Inventors: Richard W. Piety; Kenneth R. Piety, both of Knoxville, Tenn.

[73] Assignee: Computational Systems, Inc., Knoxville, Tenn.

[21] Appl. No.: 252,734

[22] Filed: Jun. 2, 1994

[51] Int. Cl.⁶ ................................................. G01M 7/02
[52] U.S. Cl. .................. 364/508; 364/551.01; 73/660; 73/66; 73/462; 73/457
[58] Field of Search ............................ 364/508, 550, 364/551.01; 73/660, 593, 462, 649, 66, 457, 458, 459

[56] References Cited

U.S. PATENT DOCUMENTS

| | | | |
|---|---|---|---|
| 3,938,394 | 2/1976 | Morrow et al. | 73/462 |
| 4,064,704 | 12/1977 | Blackburn | 73/660 |
| 4,184,205 | 1/1980 | Morrow | 364/508 |
| 4,302,813 | 11/1981 | Kurihara et al. | 364/508 |
| 4,322,976 | 4/1982 | Sisson et al. | 73/650 |
| 4,352,293 | 10/1982 | Kurihara et al. | 73/593 |
| 4,399,513 | 8/1983 | Sullivan et al. | 364/551 |
| 4,408,285 | 10/1983 | Sisson et al. | 364/508 |
| 4,426,641 | 1/1984 | Kurihara et al. | 340/683 |
| 4,437,163 | 3/1984 | Kurihara et al. | 364/508 |
| 4,453,407 | 6/1984 | Sato et al. | 73/462 |
| 4,484,474 | 11/1984 | Maus | 73/462 |
| 4,520,674 | 6/1985 | Canada et al. | 73/660 |
| 4,535,411 | 8/1985 | Blackburn et al. | 364/508 |
| 4,612,620 | 9/1986 | Davis et al. | 364/551 |
| 4,619,142 | 10/1986 | Gisler | 73/462 |
| 4,868,762 | 10/1989 | Grim et al. | 364/508 |
| 4,885,707 | 12/1989 | Nichol et al. | 364/551.01 |
| 4,912,661 | 3/1990 | Potter | 364/550 |
| 4,977,516 | 12/1990 | Shepherd | 364/508 |
| 5,089,969 | 2/1992 | Bradshaw et al. | 364/463 |
| 5,099,430 | 3/1992 | Hirsch | 364/463 |
| 5,109,700 | 5/1992 | Hicho | 73/660 |
| 5,115,671 | 5/1992 | Hicho | 73/488 |
| 5,251,151 | 10/1993 | Demjanenko et al. | 364/550 |
| 5,412,583 | 5/1995 | Cameron et al. | 364/508 |

OTHER PUBLICATIONS

Omega Engineering, Supplemental Handbook, vol. 27, 1991, pp. F–83 to F–97.
Balmac No Date.
Bently Nevada Multiplane Balancing Software ©1992.
Bently Nevada TK 83 Balance Master No Date.
DLI Engineering Balance ALERT No ©Date.
EPRI ROBAL Jul. 1987 Users Manual.
IRD Balancing Program No ©Date.
IRD Model 245 1987.
IRD Model 246–1992 Form 5080A, 1991 Form 5080.
IRD Series 290–1990 LO 8038.
IRD 885–1990 Form #5038.
Ortho Ranger Digital Protractor No Date.
Schenck Series 40 Magazine Advertisement–1992–No Date on Literature.
SKF CMVA10/CMVA 20 No Date.
SKF CMVA40 No Date.
TEC PDM Pro Balancer 1992.
TWI Mechanic's Helper No Date.

*Primary Examiner*—Emanuel T. Voeltz
*Assistant Examiner*—Patrick J. Assouad
*Attorney, Agent, or Firm*—Luedeka, Neely & Graham PC

[57] ABSTRACT

A portable, hand-held, battery-powered rotor balancing calculator has a data port, which includes a host communications port to down-load set-up data from, and upload collected data to a host computer. A rotation sensor communications port receives data from the rotation sensor, and a vibration sensor communications port receives data from vibration sensors. An angle sensor communications port receives data from an angle sensor, and the calculator determines how far and in what direction the rotor has been rotated. The calculator also employs a power supply, a processor, and an operator interface. There is also a memory for data storage, menus with check-off lists, and procedures, including raw data screening procedures and collected data analysis procedures. A display is provided which depicts gathered data in a graphical form which is easily reconfigured for rotor viewing orientation.

33 Claims, 9 Drawing Sheets

```
            USER  ALERT  !!
  REFERENCE  DATA  1X RPM  IS   < 50%
  OF TOTAL VIBRATORY  ENERGY  AT :

PLANE  1 :  IBH  —  OK
                 IBV  —  17%
     PLANE  2 :  OBH  —  OK
                 OBV  —  OK (SEE  HELP  MESSAGE)
        PRESS  ENTER  TO  CONTINUE
```

Fig. 11

```
            USER  ALERT  !!
      REFERENCE  DATA  VIBRATION
      IS  DIRECTION  SENSITVE  AT :
  PLANE 1 :  IBH  —  NOT  DETECTED
             IBV  —  MODERATE
  PLANE 2 :  OBH  —  NOT  DETECTED
             OBV  —  NOT  DETECTED (SEE  HELP  MESSAGE)
        PRESS  ENTER  TO  CONTINUE
```

Fig. 12

```
            USER  ALERT  !!
          REFERENCE  DATA
    AXIAL  1X  VIBRATION  >  RADIAL
              PLANE  1

1X  VIBRATION  MAY  HAVE  CAUSES
         OTHER  THAN  UNBALANCE
           (SEE  HELP  MESSAGE)
        PRESS  ENTER  TO  CONTINUE
```

Fig. 13

ROTOR BALANCING CALCULATOR

FIELD OF THE INVENTION

This invention relates to the field of instruments used to balance rotors, and more particularly those instruments that are portable, hand-held, battery-powered, and can be used without removing the rotor which is being analyzed from surrounding equipment. An appendix of the source code for the balancing instrument is incorporated by reference.

BACKGROUND OF THE INVENTION

Because of wear and other effects, rotors, or rotating members such as fans, turbines, shafts, and motors, must be periodically re-balanced so that they operate more efficiently. As a part of this balancing procedure, the rotor is analyzed to determine where it is out of balance, i.e.—heavy spots are located, and then counterbalancing weight is added to the rotor to restore its balance.

Typically, the rotor to be balanced must be taken out of service, as it must be stopped and started for several different test runs. This requirement means that technicians are interested in balancing instruments that can perform the necessary tests and analyses in as little time as possible so that the rotor can be brought back on line as soon as possible. The shorter the time that the rotor is down for maintenance, the lower the costs associated with the balancing procedure.

To balance a machine, typically, the rotor is stopped and vibration sensors are attached to the rotor at each bearing location, on the outside of the bearing mounts on stationary, non-rotating sites. Usually a mark is placed on the rotor so that there is a reference for determining where the heavy spot on the rotor is located and a stationary rotation sensor is used to detect the passing of the reference mark as the rotor rotates.

A reference run is then performed by bringing the rotor up to operating speed. The technician collects data from the vibration sensors, and correlates it against the data collected from the rotation sensor.

Next, trial runs are performed, one trial run for each weight plane on the rotor. For each trial run, a known amount of weight is placed in a known location on a single weight plane. The rotor is brought up to speed, and data is collected as during the reference run. The rotor is then stopped and weight is placed on the second weight plane. The rotor is brought up to speed, and data is again collected. This is repeated for each weight plane on the rotor.

When the trial runs are completed, the technician calculates influence coefficients using the data sets collected from the reference and trial runs. The influence coefficients are used to calculate the amount and location of counterbalancing weight to be added to the light spot in each weight plane of the rotor to bring it into balance. The location of the weight to be added is expressed in units of degrees away from the reference mark that was placed on the rotor. An angle sensor, attached to an axial face or appendage of the rotor, is used to determine the correct rotor orientation. The technician places the weight, and performs another run to verify that the rotor has been brought within allowable balance tolerances.

Trim runs using the same influence coefficients are performed if the rotor is not quite within tolerance. If the rotor had been far out of balance before the start of the balancing procedure, it may be necessary to perform a second set of reference and trial runs with the balancing weight in place, to determine new influence coefficients.

There have traditionally been several problems associated with balancing procedures, all of which result in higher maintenance costs than are necessary because they cause the procedure to take longer than is needed, thus increasing the cost associated with paying the technician, and the cost of having the machine out of service for an extended length of time, as well as causing unnecessary wear on the machine.

The influence coefficients for a rotor do not need to be calculated anew each time the rotor is balanced, if it is possible for the technician to set up the vibration and rotation sensors in exactly the same manner each time the balancing procedure is performed. Unfortunately, notes taken by different technicians, who make notations with differing degrees of accuracy and descriptiveness, have proven inadequate to ensure repeatable equipment set-up. There is a need, therefore, for an instrument that ensures that the same equipment set-up is accomplished each time the rotor is balanced, even if it is not the same technician that performs the balancing procedure each time.

The technician collects data from the vibration sensors, the rotation sensor, and the angle sensor during the balancing procedure. This data must all be correctly correlated to properly balance the rotor. Any data errors, such as reading a sensor incorrectly, recording the data incorrectly, or mismatching data taken from different sensor locations will result in an incorrect amount of weight being applied in an incorrect location on the rotor. The rotor will not be balanced, and the time required for the procedure will be unnecessarily extended. There is a need for an instrument that ensures that the data collected is accurate, timely, and properly correlated with all other data.

Even though a rotor exhibits excessive vibration, the problem may not be rotor unbalance. Rotor misalignment, resonance, cracked or worn bearings, or some other problem may be responsible for the vibration. Performing a balancing procedure will not fix any of these problems, but will extend the length of time the rotor is down for service. An instrument is needed to quickly determine if a problem other than unbalance is present, so that the technician is alerted to the true nature of the problem, and down-time is kept to a minimum.

The vibration, rotation, and angle information received from the sensors is in a "raw" form that is difficult to interpret. This difficulty leads to mistakes which extend down-time. There is a need for an instrument that presents the data to the technician in a form that is quickly and easily understood, and allows for immediate redisplay according to the technician's perspective and preference.

It takes a variable length of time for a rotor to reach a steady state of operation once started and turning at full speed, due to thermal and other effects. There may also be other conditions which either prevent the rotor from ever achieving steady-state operation, or intermittently affect steady-state operation. Collecting non-steady-state data will result in erroneous results as mentioned above, and extended down-time. An instrument is needed that consistently determines when the rotor is at steady-state, and when reliable data is being gathered.

Because the balancing procedure is lengthy, complicated, varies according to rotor configuration, and must be performed in a specific sequence, there is ample opportunity to confuse the order of steps to be performed. When this occurs, the technician must return to the last step performed in proper sequence, and restart the procedure from that point. An instrument for ensuring that the proper steps in the proper sequence are always followed is needed.

SUMMARY OF THE INVENTION

The present invention satisfies these and other needs by providing an instrument that, in the preferred embodiment, records complete set-up information for multiple rotors, automatically collects data from the vibration, rotation, and angle sensors, analyzes the collected data for indications of problems other than unbalance and alerts the technician to these problems, screens the data for trends, anomalies, and artifacts and alerts the technician when reliable readings can be recorded, graphically displays the collected data in a readily understood and reconfigurable manner, and has menus that logically guide the technician through the proper sequence of the appropriate balancing procedure steps.

In accordance with one embodiment, a portable, handheld, battery-powered balancing instrument is provided. The instrument is of the type used for in-situ field balancing procedures, in that it does not require the rotor which is to be balanced to be removed from the rest of the equipment.

At least one vibration sensor is provided, which detects vibration and produces vibration data. In the preferred embodiment, the vibration data has radial, axial, horizontal, vertical, synchronous, asynchronous, and unbalance components. A rotation sensor provides rotation data. An angle sensor is provided in the preferred embodiment, which produces angle data, including at least the degree of rotation and the direction of rotation.

The instrument has a data port with several components. The first is a host communications port for communicating with a host computer. Set-up data is downloaded from the host computer to the balancing instrument. The set-up data preferably includes a machine identification for the rotor to be balanced, the location of weight planes on the rotor, the location of measurement points to be used during the balancing procedure, the speeds at which the rotor is to be balanced, information about the vibration sensors used, influence information, and fields in which a technician has recorded comments about previous balancing procedures, if any.

A vibration sensor communications port for receiving vibration data is also included in the data port. There is a rotation sensor communications port. Rotation data is received from the rotation sensor and passes through the rotation sensor communications port to the balancing instrument.

Finally there is an angle sensor communications port included in the data port.. Through the angle sensor communications port the balancing instrument receives angle data from the angle sensor. The angle data describes the direction and incremental amount, or degree of rotor rotation after a reset to zero command is initiated by the balancing instrument based on input by user or the rotation sensor. Preferably, the balancing instrument determines the zero position based on the rotation data from the location of the reference mark located on the rotor.

A conditioning circuit receives the data provided by the vibration communications port, the rotation communications port, and the angle communications port. The conditioning circuit contains amplifiers, gain control circuits, D.C. offset circuits, and other conventional conditioning circuitry. The conditioning circuit passes the data on to an analog to digital converter. Any of the vibration, rotation, or angle data that is not received in digital form is converted to digital form by the analog to digital converter.

A power supply provides power for the balancing instrument. An operator interface is used by the technician to input commands into the balancing instrument.

The balancing instrument incorporates several different memories. A set-up storage memory holds the set-up data that is downloaded from the host computer. Set-up data is also held here prior to being uploaded from the balancing instrument to the host computer. A data storage memory holds the data, in digital form, gathered from the vibration, rotation, and angle sensors during reference, trial, and trim runs.

A procedure storage memory holds all the balancing instrument operating procedure menus and analysis routines. There are several analysis routines associated with the procedure storage memory.

There is a vibration amplitude analysis routine. The routine determines the average amplitude of the vibration data. The vibration amplitude analysis routine also generates a vibration amplitude alert signal that corresponds to the average amplitude, in that the signal increases as the change in amplitude increases, and the signal decreases as the change in amplitude decreases.

A vibration phase analysis routine determines the average phase of the vibration data, where phase is the angle between a vibration vector and a reference point that are synchronous with rotor rotation. The vibration phase analysis routine generates a vibration phase data signal that corresponds to the phase, in that the signal increases as the phase increases from the reference point, and the signal decreases as the phase decreases from the reference point.

A rotation analysis routine is included to determine when the rotation data indicates that the frequency of rotation varies by more than a predetermined amount from a predetermined value. When this condition exists, the routine generates a rotation alert signal.

An unbalance analysis routine determines when the unbalance component of the vibration data is less than a predetermined percentage of the overall vibration of the vibration data. When this condition exists, the routine generates a low-unbalance vibration alert signal. Preferably, the unbalance analysis routine compares the 1 ×RPM vibration to overall vibration, where 1×RPM vibration is the vibration energy that is synchronous with rotation at one times the rotation speed, which would not include vibration energy synchronous with the rotation speed at multiples greater than one or that is asynchronous with the rotation speed.

A directional vibration analysis routine is included, which determines when a first directional component of the vibration data varies more than a predetermined amount from a second directional component of the vibration data. When this condition exists, the routine generates a directional vibration alert signal. Any two radial directions may be chosen for this test, but horizontal and vertical are often used. In the preferred embodiment, if the ratio of the first and second directional components is greater than 3:1, but less than 8:1, the directional unbalance is classified as moderate and the directional vibration alert signal includes an indication of moderate directional unbalance. If the ratio of the first and second directional components is greater than 8:1, a highly directional unbalance is indicated in the directional vibration alert signal.

This routine also compares the phase of the two directional components. If the directional components are oriented at about ninety degrees, preferably + or −5°, one with respect to the other, and the phase change is about 0° or 180°, again preferably + or −5°, then the directional vibration alert signal includes an indication of "Resonance Likely" indicating that resonant vibration in the equipment being measured is likely.

A synchronous axial vibration analysis routine determines when the 1×RPM synchronous axial component of the vibration data is greater than the 1×RPM synchronous radial component of the vibration data. When this condition exists, the routine generates a synchronous axial vibration alert signal.

A vibration amplitude deviation analysis routine determines the rate of change of the amplitude of the vibration data. The vibration amplitude deviation analysis routine generates a vibration amplitude deviation signal that corresponds to the amplitude deviation, in that the signal increases as the amplitude deviation increases, and the signal decreases as the amplitude deviation decreases. For example, in the preferred embodiment, the instrument repetitively determines over time the amplitude of vibration and the amount of change which constitutes the amplitude deviation signal. If the amount of change is greater than a predetermined percentage threshold, the alert is generated. In the preferred embodiment, each measurement of amplitude is an accumulated average amplitude.

Finally, there is a vibration phase deviation analysis routine that .determines the rate of change of the phase of the vibration data. The vibration phase deviation analysis routine generates a vibration phase deviation signal that corresponds to the phase deviation, in that the signal increases as the phase deviation increases, and the signal decreases as the phase deviation decreases. This routine measures the cumulative amount and direction of vibration phase change and generates an alert when the change in either direction exceeds one or more of two predetermined criteria. First, phase stability is determined to be poor if it varies by more than five degrees between measurements, or second, if it varies outside of a stable window of phase angles. Preferably, each phase measurement is a cumulative average phase, and the size of the phase window is five degrees. An output display indicates whether the phase stability is good or poor.

There are several menus held in the procedure storage memory. They include all the steps necessary to complete the balancing procedure. All the menu steps are listed in order. Only those steps required, as determined by the set-up data, are displayed in the menus. The menus have fields that prompt the technician to enter that data that must be manually keyed in. There are confirmation displays for the technician to confirm the use of data that is automatically gathered by the balancing instrument from the vibration, rotation, and angle sensors. Check-boxes are used in the menus to display which steps have already been completed.

The balancing instrument has a processor. The processor performs all the calculations necessary to analyze the digital vibration, rotation, and angle data. It is responsive to the set-up data, and the commands received from the operator interface, and produces output data.

A display receives and displays at least a portion of the output data. The display includes graphic display elements in the form of a bar chart. These graphics are responsive to the vibration amplitude deviation signal, and indicate when the vibration amplitude deviation signal is greater than a predetermined value, and when the vibration amplitude deviation signal is less than the predetermined value. When the signal is greater than the predetermined value, the vibration data is unacceptable for a reliable reading and the display indicates that vibration amplitude stability is poor. When the signal is less than the predetermined value, the vibration data is acceptable for a reliable reading, and the display indicates that vibration amplitude stability is good.

Graphic display elements in the form of a polar chart are responsive to the vibration amplitude signal, in that they appear as vectors and endpoints, the length of which correspond to the value of the vibration amplitude signal. By the length of the displayed vectors and endpoints, instantaneous .and average vibration amplitude are displayed.

Graphic display elements in the form of a bar chart are responsive to the vibration phase deviation signal, and indicate when the vibration phase deviation signal is greater than a predetermined value, and when the signal is less than the predetermined value. When the signal is greater than the predetermined value, the vibration data is unacceptable for a reliable reading, and the display indicates that the vibration phase stability is poor. When the signal is less than the predetermined value, the vibration data is acceptable for a reliable reading, and the display indicates that the vibration phase stability is good.

Graphic display elements in the form of a polar chart are responsive to the vibration phase signal, in that they appear as vectors and endpoints, the angular location of which corresponds to the value of the vibration phase signal. By the angular location of the displayed vectors and vector endpoints, the minimum, maximum, instantaneous, and average vibration phase are displayed.

The display is also provided for displaying a warning in response to the rotation alert signal indicating that the data is unacceptable for a reliable reading. Further, it displays warnings and help messages when problems other than unbalance are suspected. In response to the low-unbalance signal, the directional vibration alert signal, or the synchronous axial vibration alert signal, the display warns that vibration may be due to other causes. In the case of a synchronous axial vibration alert signal, the display will also warn that the vibration may be caused by misalignment between two coupled shafts.

These and other features, aspects, and advantages of the present invention will become better understood with reference to the following description and appended claims.

BRIEF DESCRIPTION OF THE DRAWINGS

FIG. 11 is a synchronous vibration data alert screen.

FIG. 12 is a directional vibration data alert screen.

FIG. 13 is a synchronous axial vibration data alert screen.

DETAILED DESCRIPTION OF THE PREFERRED EMBODIMENT

Figure 1:
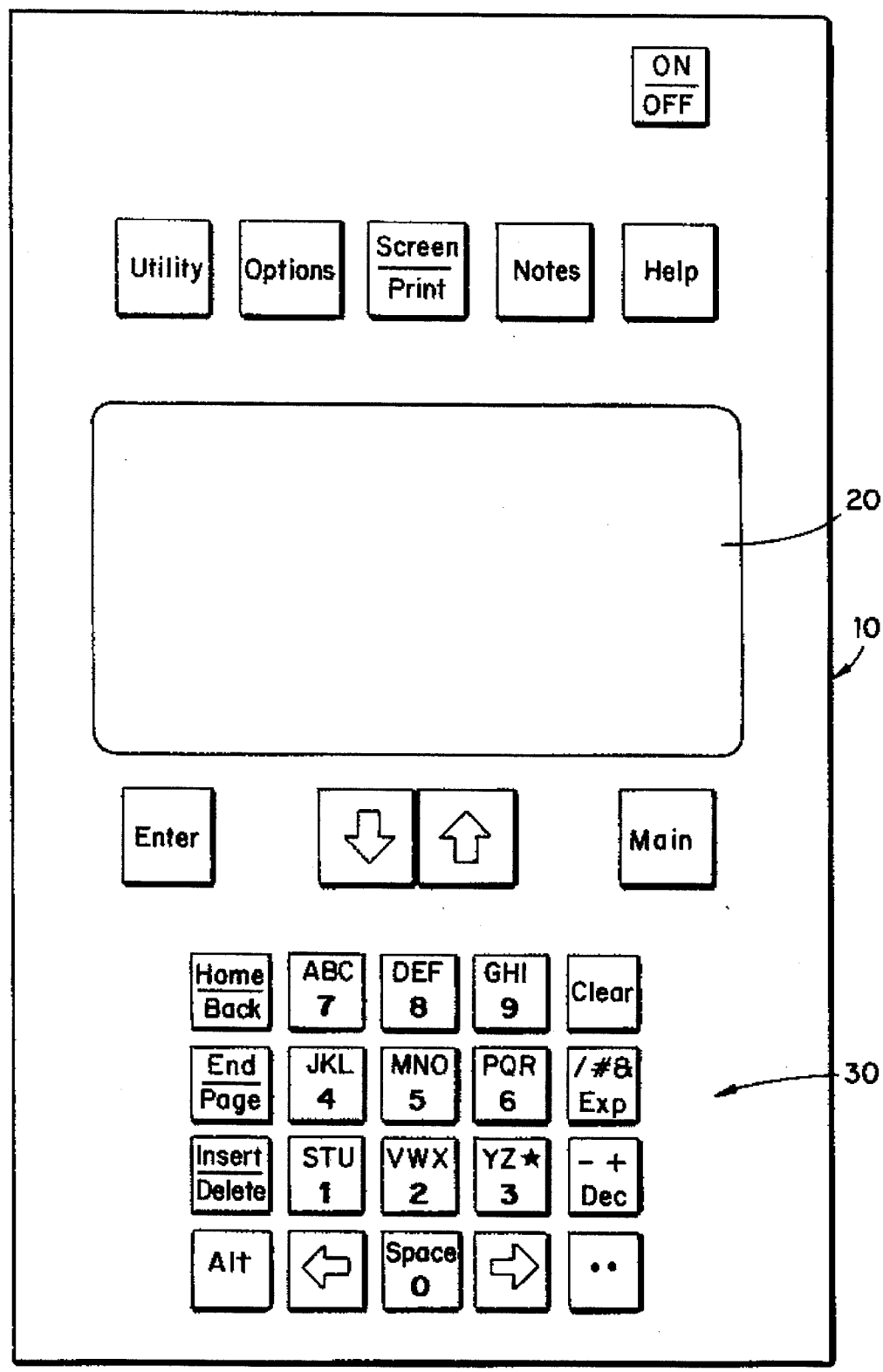
FIG. 1 illustrates the face of the balancing instrument.

Referring to the drawings, in which like characters designate like or corresponding parts throughout the several views, a preferred embodiment of the invention is shown. In FIG. 1 there is depicted a balancing instrument 10 with display 20 and operator interface 30, which is preferably a membrane keyboard and keyboard interface electronic circuitry. In the preferred embodiment the instrument is sufficiently small such that the technician can reach all of the keys of the interface 30 easily with his thumbs while holding the instrument with both hands, or alternately that the unit can be held comfortably with one hand while the other is used to operate the interface.

Figure 2A:
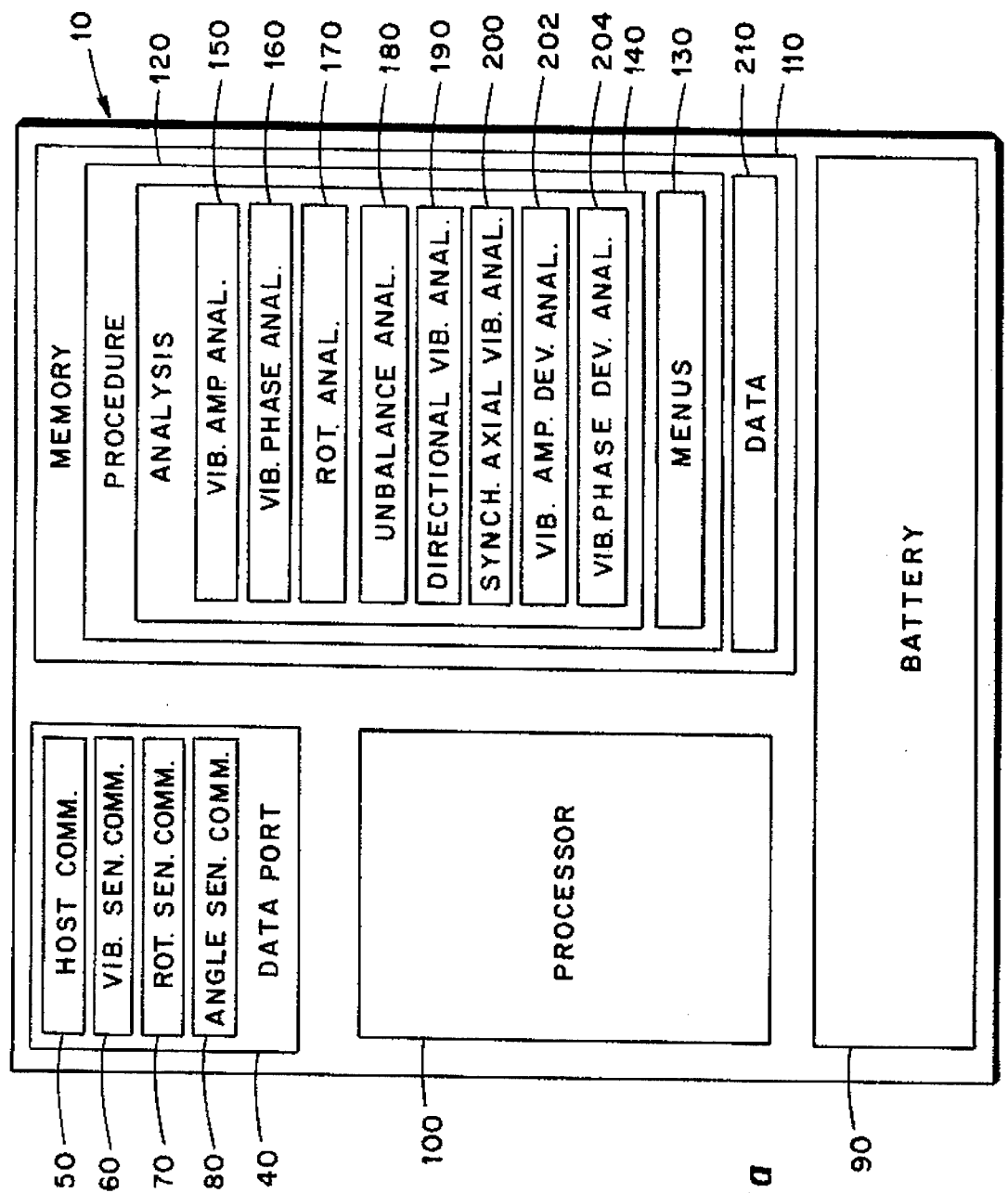
FIG. 2a is a diagram of the functional elements of the balancing instrument.

In FIG. 2a there is shown a diagrammatic representation of the functional elements within the preferred embodiment of the instrument 10. The data port 40 is used for communication of various types of data between the instrument 10 and other instruments and equipment. It will be appreciated that the term port as used herein refers to all electronic components commonly recognized in the industry as necessary for standard input/output, though the individual components will not be enumerated herein. The data port 40 includes a host communications port 50, a vibration sensor communications port 60, a rotation sensor communications port 70, and an angle sensor communications port 80. Each of these ports will be discussed in greater detail below.

The balancing instrument 10 also includes a rechargeable battery 90, a processor 100, and a memory 110. The memory 110 contains different sections including a procedure storage memory 120 and a data memory 210. Within the procedure storage memory 120 are located the menus 130 and the analysis routines 140. The analysis routines 140 further include a vibration amplitude analysis routine 150, a vibration phase analysis routine 160, a rotation analysis routine 170, an unbalance analysis routine 180, a directional vibration analysis routine 190, a synchronous axial vibration analysis routine 200, a vibration amplitude deviation analysis routine 202, and a vibration phase deviation analysis routine 204. Each of these analysis routines will be discussed in greater detail below.

Figure 2B:
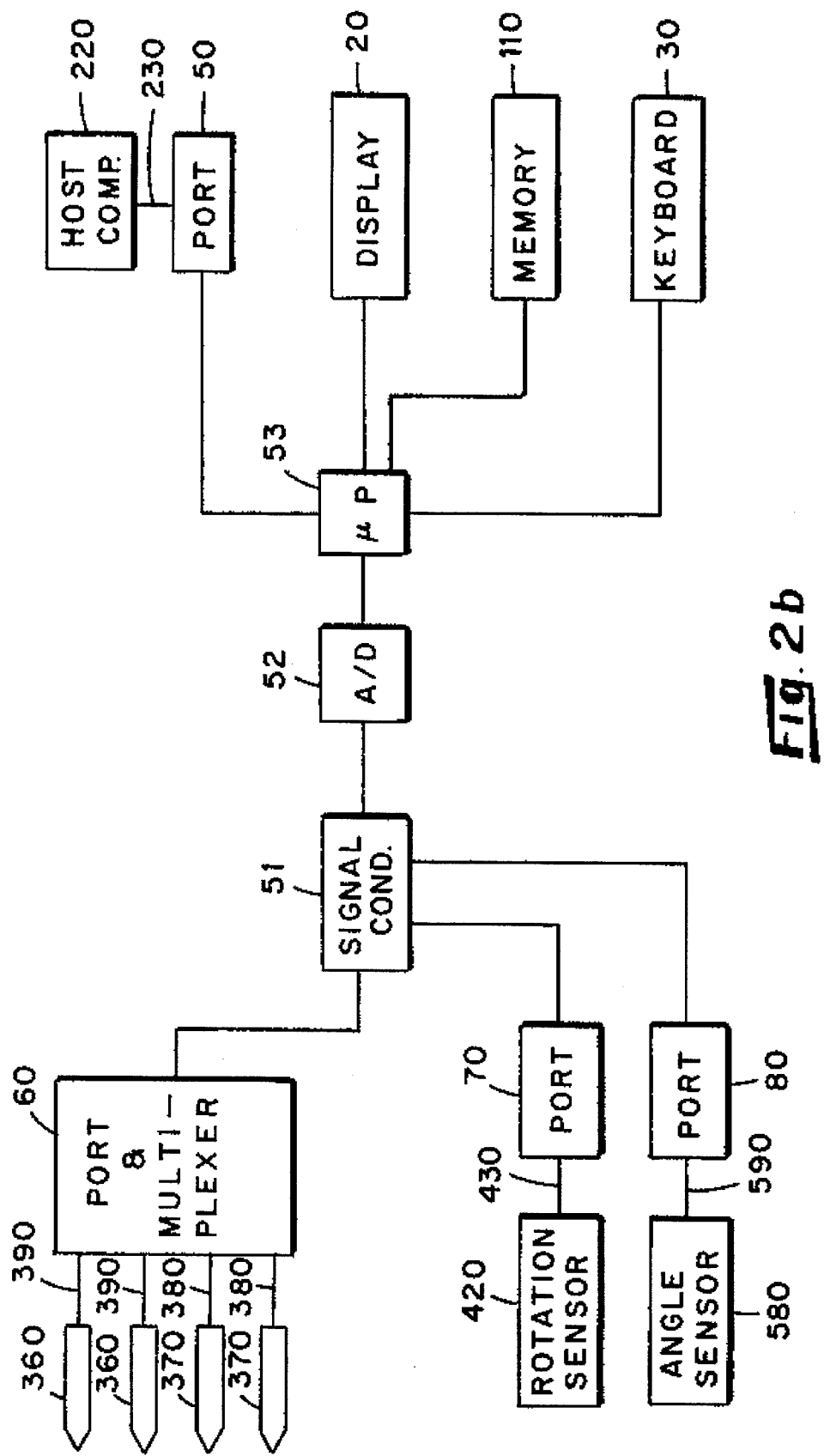
FIG. 2b is a schematic diagram of the balancing instrument.

There is shown in FIG. 2b a block diagram of the instrument 10. Several vibration sensors 360, 370 are connected to the vibration sensor communications port 60. In this example there are four vibration sensors 360, 370, which are connected by wires 390 and 380 respectively. Many different types of vibration sensors 360 and 370 may be used, such as accelerometers and velocity sensors, but in the preferred embodiment all sensors will be of the same type. The vibration sensors 360, 370 sense vibration and generate a signal which is sent on the wires 380, 390 to the vibration sensor communications port 60. In the preferred embodiment, the vibration sensor communications port 60 includes a multiplexer. An example of a suitable multiplexer is model 642 available from Computational Systems, Inc.

The vibration sensor communications port sends the vibration data to the signal conditioner 51, which includes amplifiers, gain control circuits, DC offset circuits, and other conventional conditioning circuitry. Also connected to the signal conditioner 51 is the rotation sensor communications port 70. The rotation sensor 420, preferably a tachometer, is connected to the rotation sensor communications port 70 by wire 430 in this example. The rotation sensor 420 senses rotation, such as rotational speed, and generates a signal which is sent on wire 430 to the rotation sensor communications port 70. The signal conditioner 51 receives rotation data from the rotation sensor communications port 70.

In an alternate embodiment, the signal conditioner 51 is also connected to the angle sensor communications port 80, which in this example communicates with the angle sensor 580 by means of wire 590. The angle sensor 580 senses change in the angular position of the sensor 580 and generates a signal which is sent on wire 590 to the angle sensor communications port 80. The signal conditioner 51 receives angle data from the angle sensor communications port 80. An example of a suitable angle sensor 580 is model No. 02337-07 available from Lucas Schaevitz, Pennsauken, N.J. In the preferred embodiment, the angle sensor 580 may be omitted and the angles are measured manually.

The signal conditioner 51 passes all the data received from the vibrations sensor communications port 60, the rotation sensor communications port 70, and the angle sensor communications port 80 to an analog to digital converter 52, which converts the analog signals received into digital signals which are processed by the microprocessor 53. In the preferred embodiment, the microprocessor used is model ZS180 available from Zilog.

The microprocessor 53 is also in communication with the host communications port 50, which in this example is connected to the host computer 220 by means of a wire 230. A display 20 is also connected to the microprocessor 53, on which at least some of the data received by the microprocessor 53 is displayed. All of the data received by the microprocessor 53 is stored in the memory 110. Set-up data is up-loaded and down-loaded between the memory 110 and the host computer 220 through the wire 230 and the host communications port 50. The technician controls the operation of the instrument 10 by means of the operator interface 30. The microprocessor 53 not only sends and receives data from the aforementioned components, but controls them as well by means of control connections well known by those skilled in the art of electronic devices.

Figure 3:
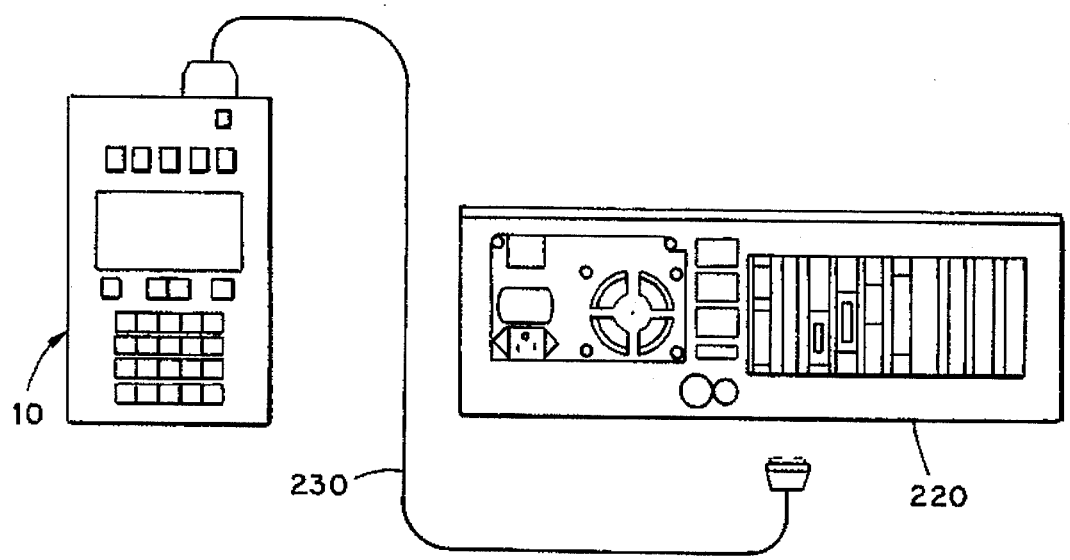
FIG. 3 shows the balancing instrument in position for connection to a host commuter..
Figure 4:
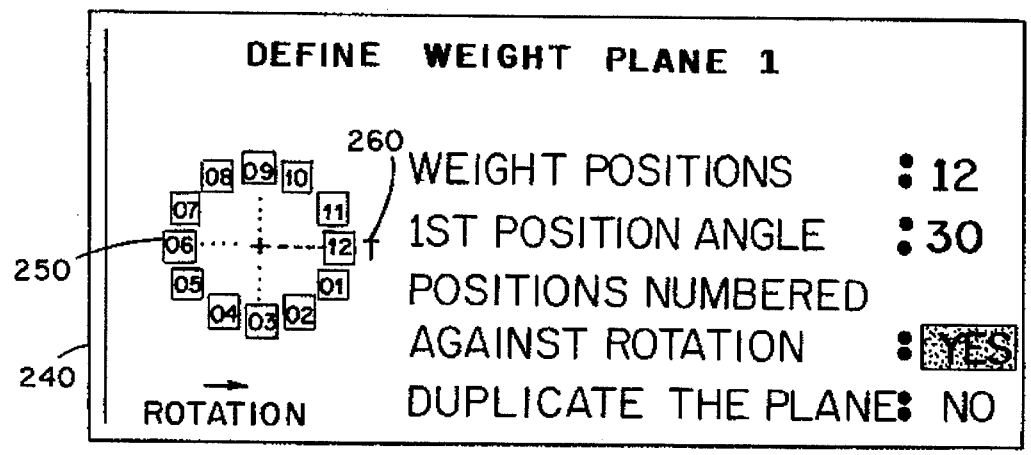
FIG. 4 is a weight plane definition screen.
Figure 7:
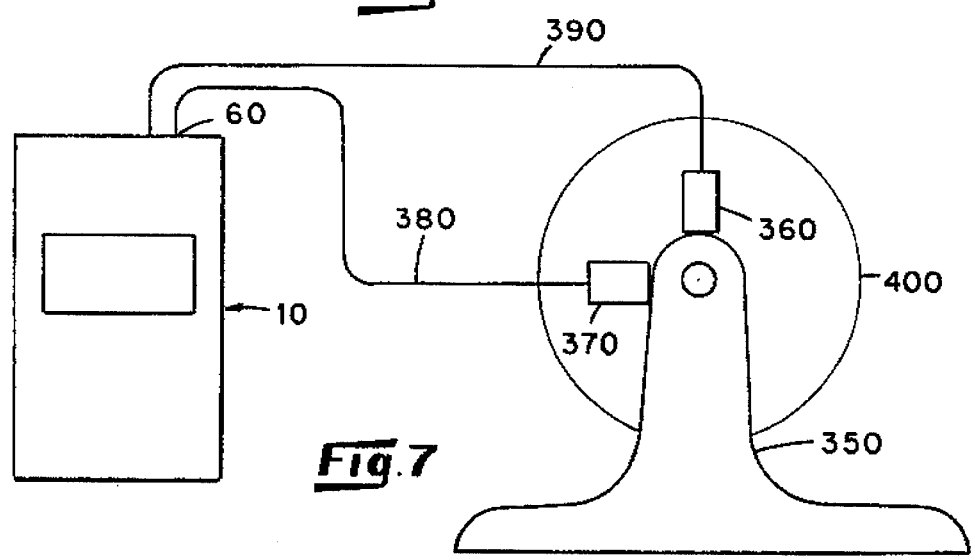
FIG. 7 shows the placement of vibration sensors.

The balancing instrument 10 connects to a host computer 220. In one example, the connection is made by means of a communication cable 230 as seen in FIG. 3, but it will be appreciated that infrared or radio, or any other similar communication media could be used. Once the instrument 10 is in communication with the host 220, data on rotors to be balanced is downloaded through the host communications port 50 of the data port 40 and stored in the data memory 210. Data on several different rotors is held in the data memory 210 simultaneously, and called up individually by the technician during the balancing procedure. The data downloaded from the host 220 includes all of the set-up and measurement data collected when the rotor in question was last balanced. In the preferred embodiment this data includes a machine identification to aid in referencing, calling up, and storing the job, and information about the rotor itself, such as the number and location of rotor weight planes, which are axial locations at which weight can be added or removed. This data is then graphically displayed on the display 20 of the instrument 10 as depicted in FIG. 4, a preferred embodiment of a weight plane definition screen 240. There is shown on the left side of the weight plane definition screen 240 a graphical representation 250 of a rotor weight plane. As can be seen there are twelve discrete locations in this example at which weight can be added, and they are numbered one through twelve relative to a reference mark 260. A representation such as that depicted in FIG. 4 is generated for each weight plane on a rotor 400 as depicted in FIG. 7.

Not all rotors have discrete weight plane locations. For these rotors, instead of weight adjustment locations that are identified by number, the location of weight adjustment must be identified by degrees. The reference point for the degree location is still the reference mark 260. In the preferred embodiment, the direction in which the degrees are measured is against rotation as described below.

Figure 5:
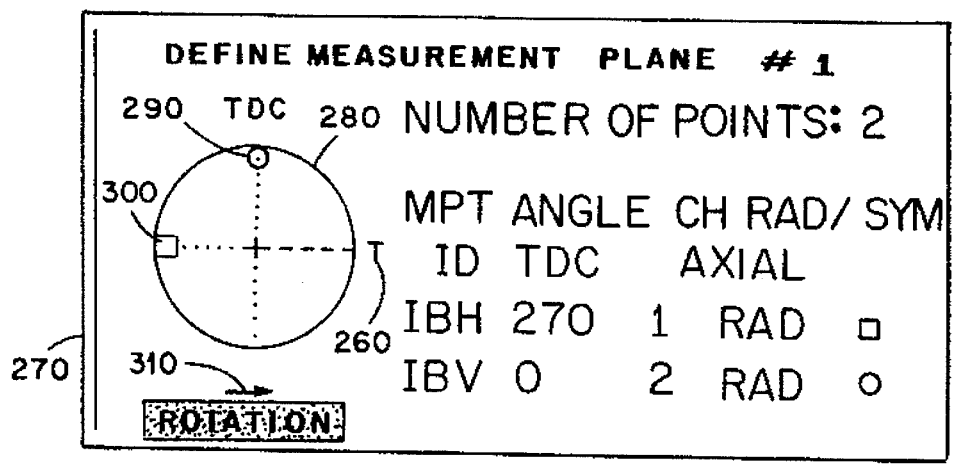
FIG. 5 is a measurement plane definition screen.

Also included in the data downloaded from the host 220 to the instrument 10 is the number and location of measurement points on the rotor. The measurement points refer to sites where vibration sensors are mounted. This data is also graphically displayed on the display 20 of the instrument 10 as depicted in FIG. 5. There is shown on the left side of the measurement plane definition screen 270 a graphical representation 280 of a measurement plane. Located on the representation 280 are two measurement sites 290, 300. In this example, site 290 is represented on the display as a circle, and site 300 is represented as a square.

Looking on the right side of the measurement plane definition screen 270 there is displayed additional information about the measurement sites 290, 300. Both sites 290, 300 are listed as "RAD," meaning radial, in the column having a heading of "RAD/AXIAL." This indicates that the sensors 360, 370 are radially oriented with the rotor 400 as depicted in FIG. 7. The instrument displays "AXIAL" in this column when a sensor is so aligned relative to the rotor 400. Also listed for each site 290, 300 is the polar location of the site as referenced from top dead center on the rotor 400. The site 290 is listed as 0, or top dead center (TDC), and the site 300 is listed as 270 degrees from top dead center.

The direction used for the degree measurement is preferably in that direction which is opposite to the normal rotation direction of the rotor. This direction is displayed in many of the screens as a notation and arrow 310. In this example the arrow 310 points to the right at the bottom of the representation 280, indicating that the rotor is rotating in a counter-clockwise direction when viewed from this orientation. Thus the degrees are measured in a clockwise direction from top dead center.

In the preferred embodiment, the technician can at any time dynamically reconfigure the measurement plane definition screen 270, or any of the other screens with a graphical representation of the rotor, by using the operator interface 30 of the balancing instrument 10 to change the rotation indication arrow 310 to the other direction. Such a change is desirable when, for example, the technician needs to work from the other end of the rotor. When this is done, all of the information is reconfigured so that even from the new perspective, the sensors 360, 370 are placed in the same location during each successive balancing procedure.

Figure 6:
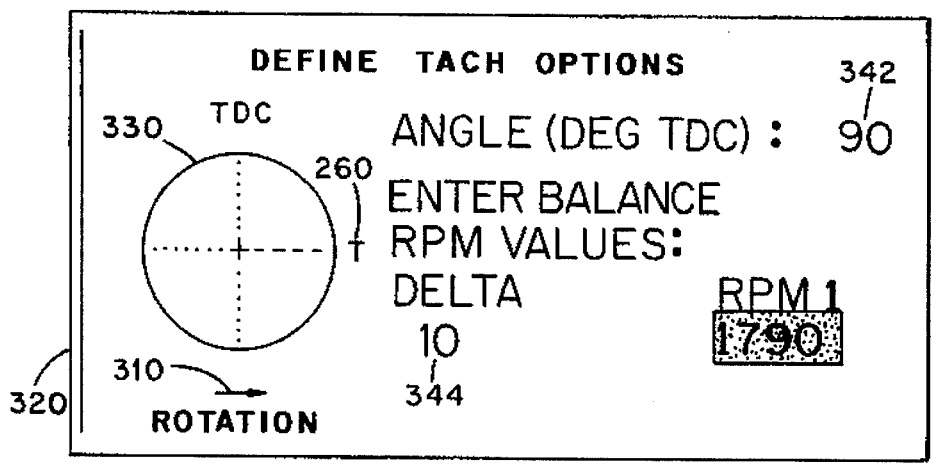
FIG. 6 is a tach location definition screen.

Also included in the set-up data downloaded from the host 220 to the instrument 10 are the speeds at which the rotor is to be balanced. In the example shown in FIG. 6, this speed information is displayed under "RPM 1" in a tach options screen 320 Additional "RPM N" where N=integer, may be specified and displayed for each job. In the preferred embodiment, up to six speeds may be specified for a job. Tolerance for allowable variation from these speeds are also included in the "DELTA" column 344. Also displayed in the tach options screen 320 is another piece of data that is downloaded, the location of the rotation sensor. In this example the location is depicted on the graphical representation 330 as the location of the reference mark "T" 260, with its position in degrees listed as 90 degrees from top dead center as shown at position 342. Notice that the tach options screen 320 also has the rotation direction notation and arrow 310, so that the orientation and display can be dynamically reconfigured by the technician as described above.

In the preferred embodiment the downloaded data includes comments by technicians who have previously balanced the rotor. Several different categories of comments are preprogrammed into the instrument 10, with many different comments within each category. By way of example, but not limitation, categories include: 1) the reason for performing the balancing procedure, 2) the initial conditions, 3) vibration and phase characteristics, and 4) procedure related comments. Also by way of example, some of the comments that are included under the reason for balance category are: 1) after overhaul, 2) high vibration, 3) new installation, 4) preventative, 5) threw balance weight, and 6) work order. There are also downloaded user defined comments, which are any notations the technician believes are useful or important to pass along. These comments are displayed in response to user commands.

Once the set-up data has been downloaded from the host 220 to the instrument 10, the technician takes the instrument into the field so as to balance rotors without having to remove them from surrounding equipment. When the technician arrives at the rotor to be balanced, the set-up information for that rotor is called up on the instrument 10 from a menu on the display 20. If this is the first time the rotor has been balanced, and set-up data has never been entered for the rotor, the data described above is loaded in manually by the technician using the interface 30.

When the set-up data has been either manually entered or called up by the technician, he is then ready to begin the balancing procedure. Vibration sensors 360, 370 are placed at a measurement site 350, for example, as depicted in FIG. 7. In the preferred embodiment, at least four vibration sensors connect at one time to the instrument 10. In this example the vibration sensor 360 is oriented to measure vertical vibration, and the vibration sensor 370 is oriented to measure horizontal vibration. Both vibration sensors 360, 370 are oriented radially with respect to rotor 400. The vibration sensors 360, 370 are chosen from different types of sensors, including acceleration, velocity, displacement, or non-standard sensors, but preferably all sensors used on a single job are of the same type. An example of an acceptable sensor type is model 777B available from Wilcoxin Research.

The vibration sensors 360, 370 are in communication with the instrument 10 through the vibration sensor communications port 60. In this depiction the communications media are wires 380, 390, however, the media could alternately be infrared or radio.

Figure 8:
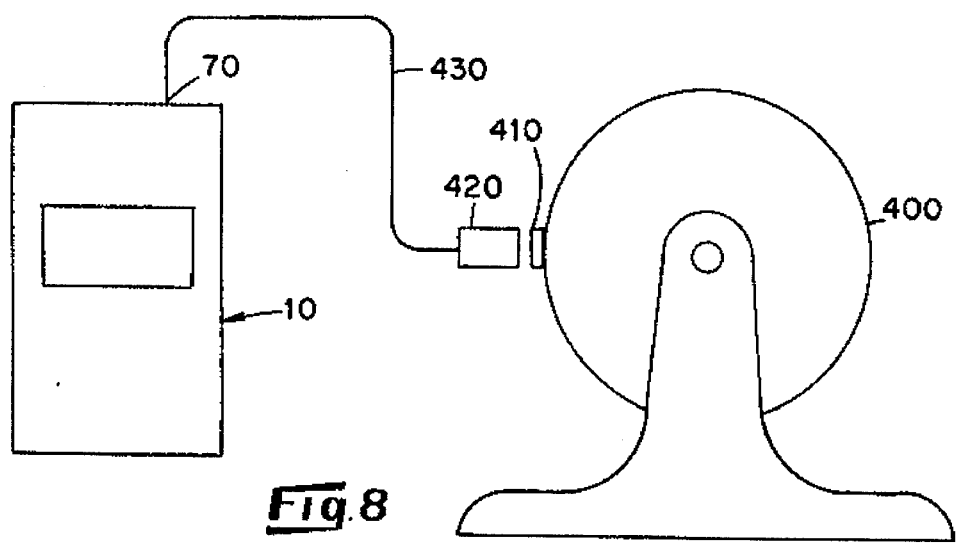
FIG. 8 shows the placement of a rotation sensor.

There is also connected to the instrument 10 a rotation sensor 420 as depicted in FIG. 8. The rotation sensor 420 in this example is connected to the instrument 10 by a wire 430 through the rotation sensor communications port 70. It will be appreciated that instead of a wire 430, another communication media such as infrared or radio could be used. The rotation sensor 420 detects the rotation of the rotor 400 by the passing of a reference mark 410. The type of mark used and the method to detect the passing of the mark is chosen from the various known systems in the art, such as using a photo-tach with a piece of reflective material, or an induction-tach with a magnet attached to the rotor 400. An example of an acceptable sensor type is model 401P available from Computational Systems, Inc., using reflective tape as a reference mark.

Figure 9:
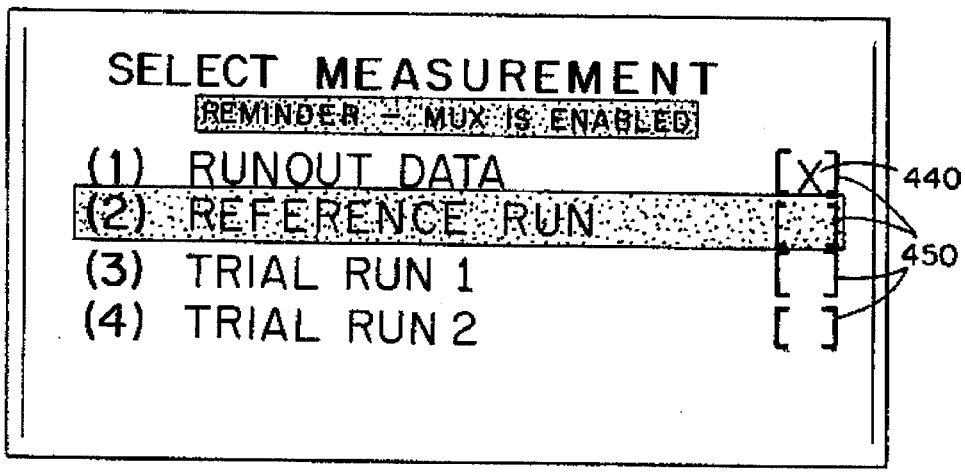
FIG. 9 is a procedure menu with step completion check boxes.

If so desired, the next step in the balancing procedure is to collect run-out data on the rotor to be balanced. Run-out data is collected during a slow roll of the rotor 400. FIG. 9 displays the menu that is displayed after the run-out data has been collected. At each step of the balancing procedure, menus guide the technician through the logically ordered steps. In each menu displayed, as in this one, there is a check box 450 displayed after each step. When a step has been completed, an "X" 440 is placed in the check box 450 so that the technician quickly sees which steps have been completed and which have not, and will not lose his place in the procedure. Only those steps that are required for the balancing procedure, as defined in the set-up data, are included in the menus.

The next step in the procedure is to perform a reference run or an "as is" run. During the reference run, the rotor 400 is operated at the speed or speeds indicated by the set-up data without the addition of any weights to the rotor. During the reference run, the initial uncorrected vibration of rotor 400 is measured and stored for comparison with trial runs, which are performed afterwards with test weight added to the rotor 400. As the rotor rotates, vibration information is collected by the instrument 10 from the vibration sensors 360, 370, and rotation information is received from the rotation sensor 420. The data received through the data port 40 is screened by the analysis routines 140, and valid data is stored in the data memory 210. There are preferably eight analysis routines that screen the data before it is stored and used for subsequent calculations. The algorithms for all analysis routines are disclosed in the appendix.

The unbalance analysis routine 180 screens the vibration data to see if the unbalance component of the vibration data is less than fifty percent of the total vibration energy. In the preferred embodiment, the unbalance component is determined by measuring synchronized radial vibration at the rotational speed of the rotor 400. Thus, the unbalance component preferably does not include synchronous energy at multiples of the rotation speed greater than one and, thus, is sometimes called the 1×RPM synchronous vibration component. If the unbalance component is less than this amount, a low unbalance vibration alert signal is generated, and a warning is displayed to the technician as depicted in FIG. 11. This condition indicates that additional problems other than unbalance exist, and that the primary problem may not be unbalance. Subsequent screens are displayed to help the technician discover the cause of the vibration.

The directional vibration analysis routine 190 screens the vibration data to see if one directional component, such as the horizontal component, of the vibration data differs by more than between about 300 to 800 percent from another directional component, such as the vertical component, of the vibration data. If this condition exists it is an indication that the vibration has complicating factors such as structural resonance influencing the unbalance, and a directional vibration alert signal is generated, and the technician is alerted by a screen depicted in FIG. 12. If the ratio of one directional component to another is between 3:1 and 8:1, it is defined as "moderate," and a ratio above 8:1 is defined as "high." The display 20 informs the operator of these conditions. In addition, if the vibration sensors 360, 370 are oriented at about 90°+ or −15° with respect to each other, and the phase difference adjusted for position variance from 90° between the components is about 0°+ or −15°, or about 180°+ or −15° then it is likely that resonance is contributing to vibration, and a "Resonance Likely" alert is also given the user.

The synchronous axial vibration analysis routine 200 screens the vibration data to see if the 1×RPM synchronous axial component of the vibration data is greater than the 1×RPM synchronous radial vibration component. If this condition exists it is an indication that the vibration is a result of something other than unbalance, and a synchronous axial vibration alert signal is generated, and the technician is alerted by a screen depicted in FIG. 13. Subsequent screens are displayed to help the technician discover the cause of the vibration.

Figure 14:
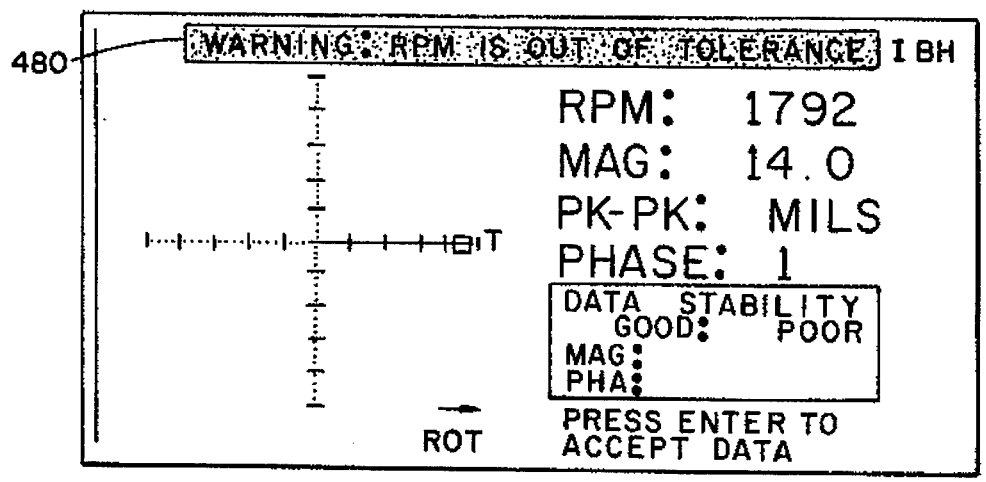
FIG. 14 is a screen with a rotation data alert message.

The rotation analysis routine 170 screens the rotation data to see if the rotation speed is within the predetermined tolerances listed in the set-up data, typically provided by the technician. If the data is not within the tolerances listed, a rotation alert signal is generated, and the technician is alerted by a warning 480 being displayed on the screen as depicted in FIG. 14. In addition to checking the rotation data for speed within tolerances, additional analysis routines check to see that the rotation signal is present and that it is stable. Stable is defined as less than about 6% change in rotation speed between samples. Data is not used in the balance calculations if either of these conditions is detected, and a specific warning message is issued to the user.

Figure 15:
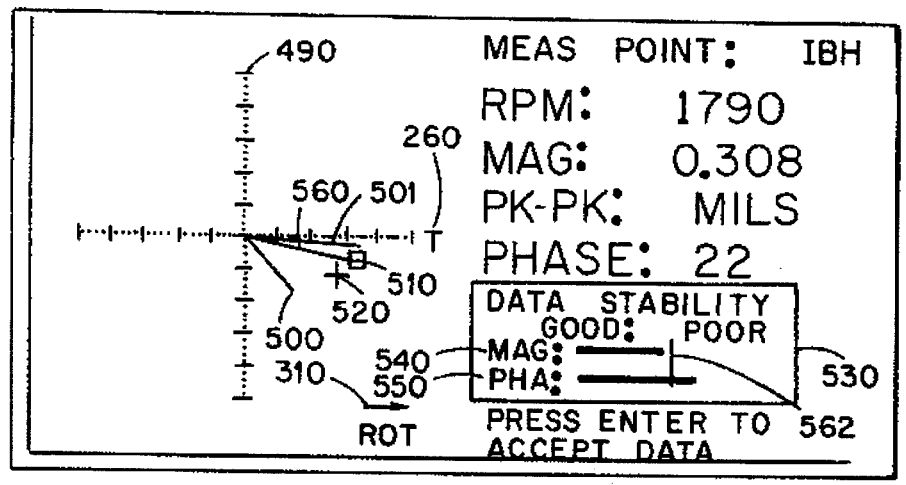
FIG. 15 is a trial run data acquisition screen.

The vibration and rotation data which makes it through these analysis routines is used to construct a representation of the vibration in the rotor, including the amplitude and phase of the vibration. FIG. 15 shows one example of such a representation. On the left of the screen is shown a polar plot 490. On the plot 490 is shown the rotation sensor reference point 260. Also shown are vectors 500, 501, 560, and endpoints 510, 520. The vectors 500, 501 delineate the maximum and minimum vibration phase respectively, as collected by the instrument 10. The vector 560 with the terminating box at endpoint 510 depicts the instantaneous vibration phase and amplitude. The longer the vector 560, the greater the amplitude. The endpoint 520 represents the average vibration phase and amplitude.

There is also shown on the screen the rotation direction notation and arrow 310, which again represent the direction of rotation of the rotor 400. This screen is also dynamically reconfigurable to a new orientation as described above.

On the right of the screen is shown a preferable embodiment of a data stability box 530. Within the data stability box 530 are two bar graphs, the vibration magnitude bar graph 540, and the vibration phase bar graph 550. The vibration magnitude bar graph 540 varies in direct proportion to the vibration amplitude deviation signal generated by the vibration amplitude deviation analysis routine 202. The vibration amplitude deviation signal is a measure of the rate of change of the standard deviation of the vibration amplitude. The vibration phase bar graph 550 varies in direct proportion to the vibration phase deviation signal generated by the vibration phase deviation analysis routine 204. The vibration phase deviation signal is a measure of the rate of change of the standard deviation of the vibration phase, and also indicates whether the range of the vibration phase deviates outside of a five degree window over time. In each case the length of the bar graphs 540, 550 are longer when the analysis routines 202, 204 generate larger signals, and are shorter when smaller signals are generated.

There is displayed within the data stability box 530 a stability indicator 562. In this example, when the bar graphs 540, 550 are to the left of the indicator 562, it means that the amplitude and phase components of the vibration data are stable and the rotor is operating at steady-state. This further indicates that the vibration data being collected is valid for the purposes of calculations to determine unbalance. While the technician could press the enter key on the operator interface 30 of the instrument 10 at any time to accept the data that is being received, more precise and effectual results will be obtained if data is not accepted until the bar graphs 540, 550 are to the left of the data stability indicator 562. In the preferred embodiment, the stability indicator 562 indicates that the averaged vibration amplitude is changing at a rate less than between about 0 to 10% per average, and preferably less than about 10%, and the averaged vibration phase is changing at a rate less than between about 0° to 5° per average, and preferably less than about 5°.

Figure 10:
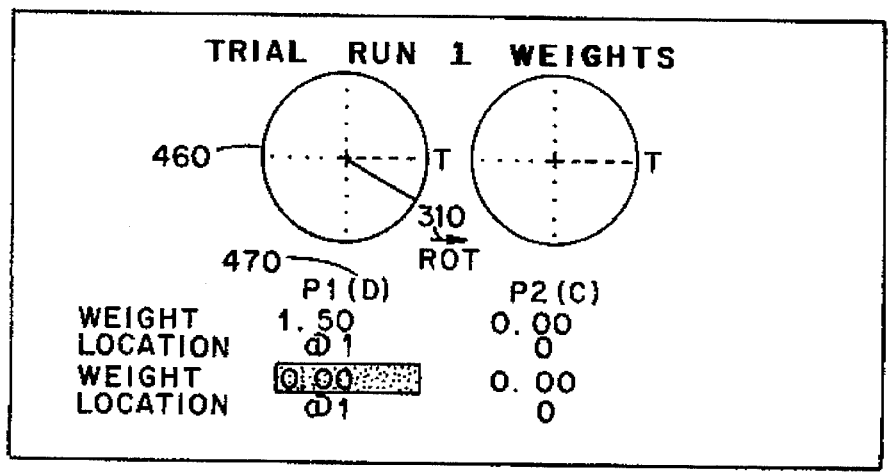
FIG. 10 is a trial run weight placement screen.

The next step in the balancing procedure is to perform trial runs. Preferably, one trial run will be performed for each weight plane on the rotor. For each trial run an amount of weight is added to a single weight plane, the rotor is started, and vibration and rotation data is collected. The weight that is added will be in an amount and location identified to the instrument 10. If the weight plane was defined in the set-up data as having discrete weight adjustment positions, the location is described as a defined location number as shown in FIG. 10. The graphical representation 460 represents the first weight plane. The "D" 470 indicates that in this example the weight plane has discrete weight adjustment locations. The data below the "D" 470 indicates that 1.5 units of weight have been added at location 1. In the preferred embodiment it is not important what the units of weight are, so long as the same units are consistently used throughout the balancing procedure. In this depiction there is provision made for two weights to be added to each weight plane should such be desired. This screen also uses the rotation direction notation and arrow 310 so that the technician can dynamically reconfigure the orientation and display as desired.

Once the weight is placed on the first weight plane and the information is entered into the instrument 10, the first trial run is commenced by starting the rotor.

Figure 16:
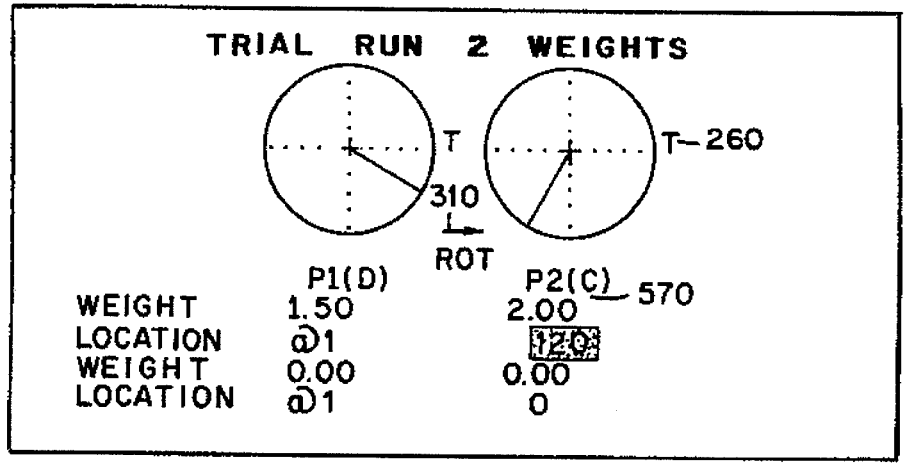
FIG. 16 is a trial run weight addition definition screen.

Once the data has been accepted for the first trial run, subsequent trial runs may be performed. The weight added to the first weight plane for the first trial run is either left in place or removed, but in the preferred embodiment the data entered into the instrument 10 for the subsequent trial runs will accurately reflect the decision made. In FIG. 16 there is shown a weight adjustment location screen for a second trial run with weight added to a second weight plane. The "C" 570 indicates that the second weight plane in this example is a continuous plane, and weight can be added at any polar location. In this example the technician chose to add two units of weight to weight plane two at a location of 120 degrees from the reference mark 260. The degrees are measured against rotation as described above, and as indicated by the rotation direction notation and arrow 310. This screen is also dynamically reconfigurable for orientation as described above.

Figure 17:
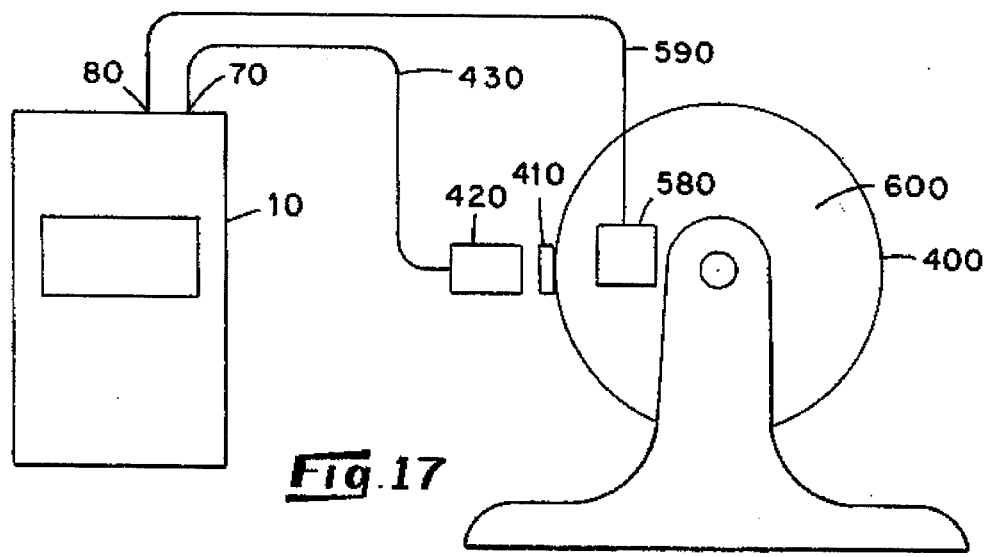
FIG. 17 shows the placement of a rotation sensor and an angle sensor.

In an alternate embodiment, the location of weight added to a continuous weight plane is precisely and automatically located by the instrument 10. To accomplish this, an angle sensor 580 is attached to an axial face 600 of the rotor 400 as depicted in FIG. 17. The angle sensor 580 is in communication with the instrument 10. In this example a wire 590 is the communication media, but it will be appreciated that another media, such as infrared or radio may be employed. The instrument 10 receives the angle data from the angle sensor 580 through the angle sensor communications port 80. During this part of the process the rotor 400 is turned by hand or jogged, but is not brought up to operating speed as the angle sensor 580 would be thrown.

The instrument 10 correlates angle data that it receives from the angle sensor 580 with rotation data that it receives from the rotation sensor 420. In this alternate embodiment, when the reference mark 410 passes the rotation sensor 420, a signal is sent to the instrument 10. When this signal is received, a reset to zero command is sent by the instrument 10 to the angle sensor 580. As the rotor 400 continues to rotate, the angle sensor 580 reports the incremental degree of rotation and the direction of rotation to the instrument 10, as measured subsequent to receiving the reset to zero command. The instrument 10 interprets the data sent from the angle sensor 580.

Using this information, the instrument 10 alerts the technician, either audibly, visually, both, or in some other manner, that the desired location of weight adjustment is in a predetermined location. For example, this location could be an access hole in the rotor casing, or top dead center on the rotor 400, or any other predetermined location as entered into the instrument 10 by the technician. By use of this angle sensor 580, the instrument 10 ensures that the technician will place the weight in the correct location, regardless of the direction in which the rotor 400 is being rotated, or from which end of the rotor 400 the technician is working, so long as the technician ensures that the rotation direction notation and arrow 310 are pointing in the correct direction for normal rotor operation rotation for the end at which he is working.

After all the trial runs have been performed, the instrument 10 calculates weight adjustments to be made to each weight plane to bring the rotor into balance. These weight adjustments are made in any one of several different ways, which the instrument 10 calculates. Weight is either added or removed from a weight plane, and the trial weights either removed prior to this, or left in place. The technician needs only to instruct the instrument 10 which method is desired.

Figure 18:
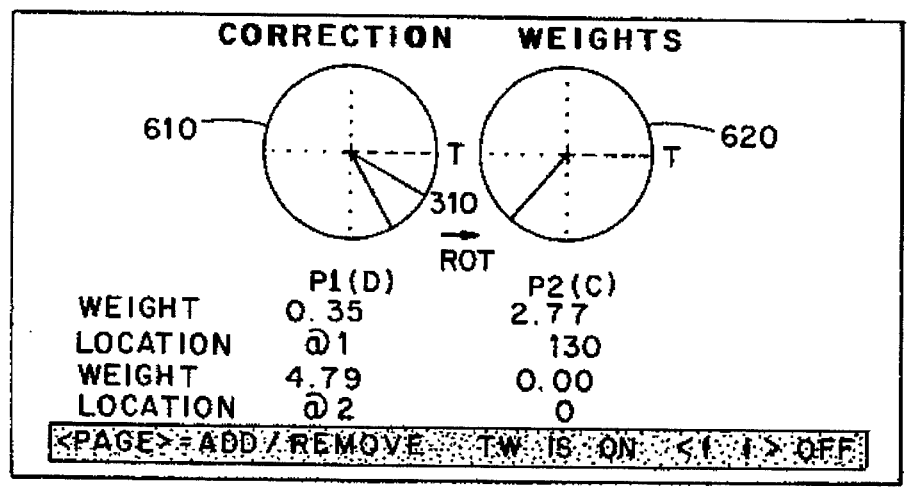
FIG. 18 is a correction weight addition definition screen.

FIG. 18 shows a screen depicting where weight is to be adjusted in two different weight planes. In this example the trial weight is to be left on, and weight is to be added, not removed. In the graphical representation 610, depicting the first weight plane, weight is to be added to two discrete locations on the weight plane. Both the location numbers as defined previously, and the amount of weight to be added to each are displayed. In this example, 0.35 units of weight are to be added to location 1, and 4.79 units of weight are to be added to location 2, both of which locations are situated on the first weight plane. Again, it is not important what units of weight are used, so long as they are used consistently throughout the balancing procedure. In the graphical representation 620, depicting the second weight plane, weight is to be added to a single location, as the second weight plane had been previously defined as a continuous weight plane. In this example, 2.77 units of weight are to be added at a location of 130 degrees against rotation from the reference mark 260. In the preferred embodiment, the angular position of the weight is measured manually. In an alternate embodiment, the precise placement of the weight on the second weight plane is accomplished by using the angle sensor 580 as described above.

Figure 19:
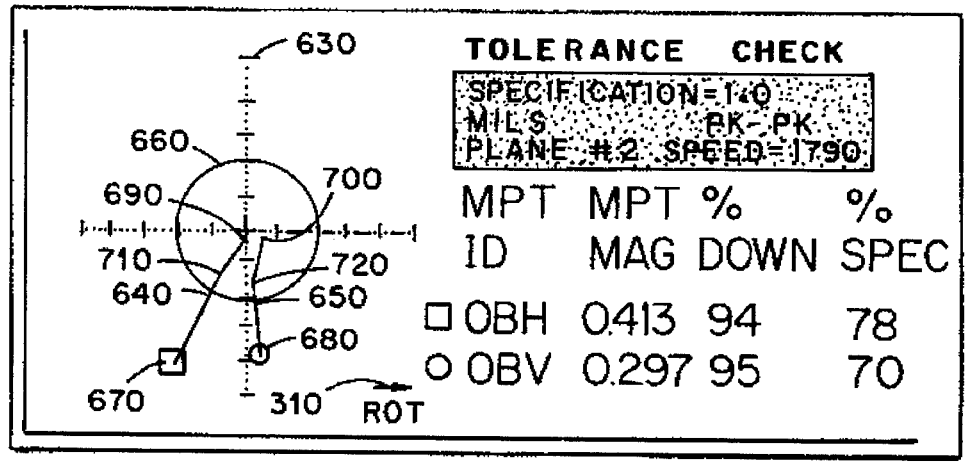
FIG. 19 is a vibration tolerance check screen.

Once the correction weight has been adjusted, a tolerance check run is performed to see if the rotor has been brought within vibration tolerance. Vibration and rotation data are collected as before for all measurement points, and displayed on a screen as depicted in FIG. 19. The polar plot 630 on the left of the screen communicates the vibration data received from the vibration sensors 360, 370. In this example the vector endpoint 670 depicts the initial vibration amplitude and phase for the horizontal vibration sensor 370, and the vector endpoint 680 depicts the initial vibration amplitude and phase for the vertical vibration sensor 360. The initial vibration amplitude and phase for each vibration sensor 360, 370 is the data collected during the reference run before any weight is added to the rotor 400. Vectors 640, 650 extend from the initial vector endpoints 670, 680 to one or more successive positions and terminate at endpoints 690, 700 representing the most recently acquired vibration amplitude and phase for each vibration sensor 360, 370. Vector end points 710, 720 represent the vibration amplitude and phase data for each vibration sensor 360, 370 acquired just prior to the last weight adjustment.

Also depicted on this screen is the rotation direction notation and arrow 310, so that the technician can dynamically reconfigure the display for a different orientation as described above. Also displayed is a circle 660 representing the unbalance vibration tolerance specification as provided in the set-up data. If the resultant vibration is still outside of the specification, which is depicted by endpoints 690, 700 located outside of the circle 660, trim calculations and weight adjustments using data from the check tolerance run are performed. By performing several of these trim runs, a rotor system that is not behaving in a linear fashion is iteratively brought within a high degree of balance, the progress of which is continually tracked graphically by the display depicted in FIG. 19.

The screen depicted in FIG. 19 also displays the specification, the plane number, the speed, the absolute magnitude of the horizontal and vertical components of the vibration, the percentage change in vibration magnitude achieved by the weight adjustment, and the horizontal and vertical components of the vibration as a percentage of the specification.

At the conclusion of the field portion of the balancing procedure, the technician removes all of the equipment from the rotor, and enters comments and remarks into the instrument 10 that will be valuable to the technician who next performs the balancing procedure on this rotor. The instrument 10 is brought back to the host computer 220, and the data from the procedure is uploaded to the host computer 220 using the equipment as shown in FIG. 3. The data resides on the host computer 220 until downloaded to the instrument 10 at some future point in time when the rotor again needs to be balanced. The influence coefficients may be included in the stored and up-loaded data, but it is preferred to store the underlying data from which the influence coefficients are calculated, namely, the data acquired during the reference, trial and check runs. This underlying data, or a portion thereof sufficient to calculate the influence coefficients, is referred to as influence information. In alternate embodiments both influence information and influence coefficients are stored and uploaded to the host computer 220.

After a rotor has been balanced once, it is not necessary to manually re-enter set-up data, as it can be up and down-loaded from the host 220 to the instrument 10. In the preferred embodiment it is necessary only to perform a tolerance check because the instrument 10 already contains the balancing data as recorded during the previous balancing procedures, thus further decreasing the time and expense required to balance the rotor. Although this specification discloses particular embodiments of the invention, these embodiments merely describe illustrations of the invention. Those skilled in the art may suggest numerous rearrangements, modifications and substitutions of the invention without departing from the spirit of the invention.

What is claimed is:

1. A portable, hand-held, battery-powered balancing instrument of the type used for in-situ field balancing procedures of a rotor comprising:

at least one vibration sensor for producing vibration data;

a rotation sensor for producing rotation data;

a data port comprising:
   a vibration sensor communications port for receiving vibration data from at least one of the vibration sensors;
   a rotation sensor communications port for receiving rotation data from the rotation sensor;

a conditioning circuit for receiving and conditioning the vibration data and the rotation data;

an analog to digital converter for receiving the vibration data and converting it to digital vibration data, and for receiving the rotation data and converting it to digital rotation data;

a power supply for supplying power to the balancing instrument;

an operator interface through which a technician inputs commands and set-up data into the balancing instrument;

a memory comprising:
   a data storage memory where the digital rotation and vibration data gathered from the rotation and vibration sensors is held; and
   a procedure storage memory where operating procedure menus and analysis routines for the balancing instrument are held, the analysis routines further comprising at least one diagnostic routine for analyzing the vibration and rotation data for determining an alert condition indicating a problem other than unbalance that may lessen the success of the balancing procedure;

a processor for receiving, processing, and analyzing the digital rotation and vibration data, based upon and responsive to the set-up data, the commands, and the analysis routines, for selectively producing an alert output when an alert condition exists, and for producing output data which includes the alert output; and a display for receiving and displaying at least a portion of the output data and for displaying information corresponding to the alert output when an alert condition exists.

2. The apparatus of claim 1 wherein said processor in response to the diagnostic routine determines whether the vibration data and rotation data is sufficiently stable for producing reliable output data corresponding to the vibration and rotation of the rotor, and for producing an alert output when the rotation data is not stable.

3. The apparatus of claim 2 further comprising:

said analysis routines including a vibration amplitude analysis routine, vibration amplitude deviation analysis routine, vibration phase analysis routine, vibration phase deviation analysis routine, rotation analysis routine;

said processor responsive to the vibration amplitude analysis routine for determining the average amplitude of the vibration data and generating a corresponding vibration amplitude alert;

said processor responsive to the vibration amplitude deviation analysis routine for determining a rate of change of amplitude of the vibration data and generating a corresponding-vibration amplitude deviation signal;

said processor responsive to the vibration phase analysis routine for determining the average phase of the vibration data and generating corresponding vibration phase data;

said processor responsive to the vibration phase deviation analysis routine for determining a rate and an amount of change of phase of the vibration data and generating a corresponding vibration phase deviation signal;

said processor responsive to the rotation analysis routine for determining when rotation data varies more than a predetermined amount from a predetermined value and generating a rotation alert; and said display for displaying information corresponding to the vibration amplitude deviation signal, vibration phase deviation signal, rotation alert, vibration phase data, and vibration amplitude alert.

4. The apparatus of claim 3 wherein said display further comprises:

graphic display elements in the form of a bar chart, responsive to the vibration amplitude deviation signal, which indicate that, when the vibration amplitude deviation signal is greater than a predetermined value, the vibration data is unacceptable for a reliable reading, and which further indicate that when the vibration amplitude deviation signal is less than a predetermined value, the vibration data is acceptable for a reliable reading;

graphic display elements in the form of a polar chart, including vectors and endpoints, responsive to the vibration amplitude signal, which by the length of displayed vectors and endpoints indicate the instantaneous and average vibration amplitude;

graphic display elements in the form of a bar chart, responsive to the vibration phase deviation signal, which indicate that when the vibration phase deviation signal is greater than a predetermined value, the vibration data is unacceptable for a reliable reading, and which further indicate that when the vibration phase deviation signal is less than a predetermined value, the vibration data is acceptable for a reliable reading;

graphic display elements in the form of a polar chart, including vectors and endpoints, responsive to the vibration phase data, which by the angular location of displayed vectors and endpoints indicate the minimum, maximum, instantaneous, and average vibration phase; and display elements responsive to the rotation alert that display a warning that rotation data is unacceptable for a reliable reading.

5. The apparatus of claim 1 wherein the diagnostic routine is an unbalance routine, said processor executes the diagnostic routine while executing the unbalance routine, and said processor in response to the diagnostic routine determines whether a rotor condition other than unbalance is contributing to vibration and for producing an alert output corresponding to this rotor condition.

6. The apparatus of claim 1 further comprising:

said vibration sensor for producing vibration data including radial, axial, horizontal, vertical, synchronous, asynchronous, and unbalance vibration components;

said analysis routines including an unbalance vibration analysis routine, synchronous axial vibration analysis routine, and directional vibration analysis routine;

said processor for determining an unbalance component of the vibration data and an overall vibration and, responsive to the unbalance vibration analysis routine, for determining when the unbalance component of the vibration data is less than a predetermined percentage of the overall vibration and generating an unbalance vibration alert;

said processor for determining a synchronous axial component and a synchronous radial component of the vibration data and responsive to the synchronous axial vibration analysis routine determining when the synchronous axial component of the vibration data is greater than the synchronous radial component of the vibration data and generating a synchronous axial vibration alert;

said processor for determining a first direction component and second direction component of the vibration data and, responsive to the directional vibration analysis routine, for determining when the first direction component of the vibration data varies more than a predetermined amount from the second direction component of the vibration data and generating a directional vibration alert;

said processor responsive to the directional vibration analysis routine for determining when the phase of the first directional component of the vibration data varies more than a predetermined amount from the phase of the second directional component of the vibration data and generating a resonance alert; and said display for displaying information corresponding to the unbalance vibration alert, synchronous axial vibration alert, directional vibration alert, and resonance alert.

7. The apparatus of claim 6 wherein said display further comprises:

display elements responsive to the unbalance alert, the directional vibration alert, the resonance alert, and the synchronous axial vibration alert that display a warning that the vibration data is caused in part by a rotor condition other than unbalance.

8. The apparatus of claim 1 further comprising:

said analysis routines including a vibration phase deviation analysis routine;

said processor responsive to the vibration phase deviation analysis routine for determining a rate and an amount of change of phase of the vibration data and generating a corresponding vibration phase deviation signal;

said display for displaying information corresponding to the vibration phase deviation signal.

9. The apparatus of claim 8 wherein said display further comprises:

graphic display elements in the form of a bar chart, responsive to the vibration phase deviation signal, which indicate that when the vibration phase deviation signal is greater than a predetermined value, the vibration data is unacceptable for a reliable reading, and which further indicate that when the vibration phase deviation signal is less than a predetermined value, the vibration data is acceptable for a reliable reading.

10. The apparatus of claim 1 further comprising:

said analysis routines including a vibration amplitude deviation analysis routine;

said processor responsive to the vibration amplitude deviation analysis routine for determining a rate of change of amplitude of the vibration data and generating a corresponding vibration amplitude deviation signal;

said display for displaying information corresponding to the amplitude deviation signal.

11. The apparatus of claim 10 wherein said display further comprises:

graphic display elements in the form of a bar chart, responsive to the vibration amplitude deviation signal, which indicate that when the vibration amplitude deviation signal is greater than a predetermined value, the vibration data is unacceptable for a reliable reading, and which further indicate that when the vibration amplitude deviation signal is less than a predetermined value, the vibration data is acceptable for a reliable reading.

12. The apparatus of claim 1 further comprising:

said vibration sensor for producing vibration data including radial, axial, horizontal, vertical, synchronous, and asynchronous vibration components;

said analysis routines including a synchronous axial vibration analysis routine;

said processor for determining a synchronous axial component and a synchronous radial component of the vibration data and responsive to the synchronous axial vibration analysis routine determining when the synchronous axial component of the vibration data is greater than the synchronous radial component of the vibration data and generating a synchronous axial vibration alert, said synchronous axial and synchronous radial components each comprising only vibration energy at the frequency of, and synchronized with, the rotation of the rotor;

said display for displaying information corresponding to the synchronous axial vibration alert.

13. The apparatus of claim 12 wherein said display further comprises:

graphic display elements responsive to the synchronous axial vibration alert that display a warning that the vibration is caused in part by rotor conditions other than unbalance.

14. The apparatus of claim 1 further comprising:

said vibration sensor for producing vibration data including first and second directional vibration components;

said analysis routines including a directional vibration analysis routine;

said processor, responsive to the directional vibration analysis routine, for determining when the first directional component of the vibration data varies more than a predetermined amount from the second directional component of the vibration data and generating a directional vibration alert;

said display for displaying information corresponding to the directional vibration alert.

15. The apparatus of claim 14 wherein said display further comprises:

graphic display elements responsive to the directional vibration alert that display a warning that vibration data is caused in part by rotor conditions other than unbalance.

16. The apparatus of claim 1 further comprising:

said vibration sensor for producing vibration data including first and second directional vibration components;

said analysis routines including a directional vibration analysis routine;

said processor, responsive to the directional vibration analysis routine, for determining when the phase of the first directional component of the vibration data varies by a predetermined amount from the phase of the second directional component of the vibration data and generating a resonance alert;

said display for displaying information corresponding to the resonance alert.

17. The apparatus of claim 16 wherein said display further comprises:

graphic display elements responsive to the resonance alert that display a warning that vibration data is caused in part by rotor conditions other than unbalance.

18. The apparatus of claim 1 further comprising:

said vibration sensor for producing vibration data including synchronous, asynchronous, and unbalance vibration components;

said analysis routines including an unbalance analysis routine;

said processor for determining an unbalance component of the vibration data and overall vibration and, responsive to the unbalance vibration analysis routine, for determining when the unbalance component of the vibration data is less than a predetermined percentage of the overall vibration and generating an unbalance vibration alert, said unbalance component comprising vibration data at the frequency of and synchronized with the rotation of the rotor;

said display for displaying information corresponding to the unbalance vibration alert.

19. The apparatus of claim 18 wherein said display further comprises:

graphic display elements responsive to the unbalance vibration alert that display a warning that unbalance is not the predominant source of vibration.

20. The apparatus of claim 1 further comprising:

said analysis routines including a rotation analysis routine;

said processor responsive to the rotation analysis routine, for determining when rotation data varies more than a predetermined amount from a predetermined value and generating a rotation alert;

said display for displaying information corresponding to the rotation alert.

21. The apparatus of claim 20 wherein said processor excludes from use data produced by said rotation and vibration sensors during a rotation alert.

22. The apparatus of claim 1 further comprising:

said analysis routines including a vibration phase analysis routine;

said processor responsive to the vibration phase analysis routine for determining the average phase of the vibration data and generating corresponding vibration phase data;

said display for displaying information corresponding to the data.

23. The apparatus of claim 22 further comprising:

said processor for determining the minimum, maximum and instantaneous phase of said vibration;

graphic display elements in the form of a polar chart, including vectors and endpoints, responsive to the vibration phase signal, which by the angular location of displayed vectors and endpoints indicate the minimum, maximum, instantaneous, and average vibration phase.

24. The apparatus of claim 1 further comprising:

said analysis routines including a vibration amplitude analysis routine;

said processor responsive to the vibration analysis routine, for determining the average amplitude of the vibration data and generating a corresponding vibration amplitude alert;

said display for displaying information corresponding to the vibration amplitude alert.

25. The apparatus of claim 24 further comprising:

said processor for determining the instantaneous amplitude of the vibration;

graphic display elements in the form of a polar chart, including vectors and endpoints, responsive to the vibration amplitude signal, which by the length of displayed vectors and endpoints indicate the instantaneous and average vibration amplitude.

26. A portable, hand-held, battery-powered balancing instrument of the type used for in-situ field balancing procedures on rotors comprising:

at least one vibration sensor for producing vibration data;

a rotation sensor for producing rotation data;

an angle sensor for producing angle data, the angle data further comprising at least angle size and direction;

a data port comprising:

a vibration sensor communications port for receiving vibration data from at least one of the vibration sensors;

a rotation sensor communications port for receiving rotation data from the rotation sensor;

an angle sensor communications port for receiving angle data from the angle sensor;

a conditioning circuit for receiving and conditioning the vibration data, the rotation data, and the angle data;

an analog to digital converter for receiving the vibration data and converting it to digital vibration data, and for receiving the rotation data and converting it to digital rotation data, and for receiving the angle data and converting it to digital angle data;

a power supply for supplying power to the balancing instrument;

an operator interface through which a technician inputs commands and set-up data into the balancing instrument;

a memory comprising:

a data storage memory where the digital rotation, vibration, and angle data gathered from the rotation, vibration, and angle sensors is held; and a procedure storage memory where operating procedure menus and analysis routines for the balancing instrument are held;

a processor for receiving, processing, and analyzing the digital rotation, vibration, and angle data, based upon and responsive to the set-up data and the commands, for producing output data that selectively includes information corresponding to angle data; and a display for receiving and displaying at least a portion of the output data and selectively including information corresponding to angle data.

27. The apparatus of claim 26 further comprising:

said processor for calculating a desired angular position based on the vibration and rotation data and for producing a desired angle signal indicating that said angle sensor is positioned in the desired angular position; and said display receiving and responding to the desired angle signal to display information indicating that the angle sensor is in the desired angular position.

28. The apparatus of claim 26 further comprising:

said processor for calculating a desired angular position corresponding to a light spot on the rotor based on the vibration and rotation data and for producing a desired angle signal indicating that said angle sensor is positioned in the desired angular position and said light spot is in a desired position; and said display receiving and responding to the desired angle signal to display information indicating that the angle sensor is in the desired angular position and the light spot is in a desired position.

29. A portable, hand-held, battery-powered balancing instrument of the type used with a host computer for in-situ field balancing procedures in which reference runs are used to determine initial balance conditions, trial runs are performed with weight added to a rotor having measurement planes being balanced, and trim runs are performed after trial runs, comprising:

at least one vibration sensor for producing vibration data;

a rotation sensor for producing rotation data;

a data port comprising:

a vibration sensor communications port for receiving vibration data from at least one of the vibration sensors; and a rotation sensor communications port for receiving rotation data from the rotation sensor;

a conditioning circuit for receiving and conditioning the vibration data and the rotation data;

an analog to digital converter for receiving the vibration data and converting it to digital vibration data, and for receiving the rotation data and converting it to digital rotation data;

a power supply for supplying power to the balancing instrument;

an operator interface through which a technician inputs commands and set-up data into the balancing instrument;

a memory comprising:

a data storage memory where the digital rotation and vibration data gathered from the rotation and vibration sensors is held; and a procedure storage memory where operating procedure menus and analysis routines for the balancing instrument are stored;

a processor for receiving, processing, and analyzing the digital rotation and vibration data, based upon and responsive to the set-up data, menus, analysis routines, and the commands, for producing output data;

a display for receiving and displaying at least a portion of the output data, said processor and display being responsive to menus stored in said data storage for displaying;

only those steps necessary to complete a given balancing procedure based upon the set-up data, listed in order to be performed, prompts for data that must be manually entered, confirmation information for the data that is automatically gathered, check-boxes indicating which steps have been completed, views of the rotor, vibration sensor, and rotation sensor corresponding to the set-up data, and the vibration sensor and the rotation sensor in the proper measurement planes, and relative to a reference located at top dead center on the rotor.

30. The apparatus of claim 29 further comprising said processor and display for graphically displaying:

the unbalance vibration tolerance specification;

the vibration data acquired prior to any weight adjustment;

the vibration data acquired subsequent to the latest weight adjustment; and the vibration data acquired just prior to the latest weight adjustment.

31. The apparatus of claim 30 wherein said graphical display further comprises:

a polar chart having X and Y axes crossing at right angles with respect to each other, and an origin located at the intersection of the axes;

the unbalance vibration tolerance specification being represented by graphic elements in the form of a circle on the polar chart, the center of which circle is located at the origin of the polar chart, and the radius of which circle represents the maximum allowable amplitude of the vibration;

the vibration data acquired prior to any weight adjustment being represented by graphic elements in the form of vector endpoints positioned on the polar chart;

the vibration data acquired subsequent to the latest weight adjustment being represented by graphic elements in the form of vector endpoints positioned on the polar chart; and the vibration data acquired-just prior to the latest weight adjustment being represented by graphic elements in the form of vector end points positioned on the polar chart.

32. The apparatus of claim 29 wherein said views of the rotor, vibration sensor, and rotation sensor further comprise:

a first and a second view, the first view being an accurate depiction of the relative locations of the rotor, vibration sensor, and rotation sensor as seen from one end of the rotor, and the second view being an accurate depiction of the relative locations of the rotor, vibration sensor, and rotation sensor as seen from the other end of the rotor;

the first and second views being interchangeably selectable during the balancing procedure for presentation on the display by commands input by the technician through the operator interface.

33. The apparatus of claim 29 wherein said views of the rotor, vibration sensor, and rotation sensor further comprise having a polar reference where 0° corresponds to the location of the rotation sensor as determined by the set-up data, and where the location of 0° can be changed by the technician by command input through the operator interface, keeping the views consistent with the actual orientation of the rotor, vibration sensor, and rotation sensor.

* * * * *